US010875425B1

(12) United States Patent
Ashu

(10) Patent No.: US 10,875,425 B1
(45) Date of Patent: Dec. 29, 2020

(54) COMBINATION CHILD SEAT AND BLANKET

(71) Applicant: Wilson Ashu, Fort Worth, TX (US)

(72) Inventor: Wilson Ashu, Fort Worth, TX (US)

( * ) Notice: Subject to any disclaimer, the term of this patent is extended or adjusted under 35 U.S.C. 154(b) by 0 days.

(21) Appl. No.: 16/282,625

(22) Filed: Feb. 22, 2019

(51) Int. Cl.
  *B60N 2/30* (2006.01)
  *B60N 2/26* (2006.01)
  *B60N 2/64* (2006.01)
  *B60N 2/90* (2018.01)
  *A47G 9/02* (2006.01)
  *A47G 9/06* (2006.01)

(52) U.S. Cl.
  CPC .......... *B60N 2/26* (2013.01); *A47G 9/0223* (2013.01); *B60N 2/64* (2013.01); *B60N 2/90* (2018.02); *A47G 9/068* (2013.01); *B60N 2/3084* (2013.01); *B60N 2/3086* (2013.01); *B60N 2205/30* (2013.01)

(58) Field of Classification Search
  CPC ...... A47G 9/068; A47G 9/066; A47G 9/0223; A47G 9/064; A47D 15/006; B60N 2/2881; B60N 2/914; B60N 2/3081; B60N 2/3084; B60N 2/3086; A47C 7/62
  See application file for complete search history.

(56) References Cited

U.S. PATENT DOCUMENTS

| | | | | |
|---|---|---|---|---|
| 4,540,216 A | * | 9/1985 | Hassel, Sr. ............ | B60N 2/3084 297/112 |
| 4,555,135 A | * | 11/1985 | Freeland ............... | B60N 2/3086 297/105 |
| 4,664,443 A | * | 5/1987 | Casale ................. | B60N 2/3084 297/238 |
| 4,756,573 A | * | 7/1988 | Simin .................. | B60N 2/3084 297/117 |
| 4,913,498 A | * | 4/1990 | Forlivio ............... | B60N 2/3084 297/238 |
| 5,100,199 A | * | 3/1992 | Vander Stel ......... | A61K 31/155 297/238 |
| 5,294,182 A | * | 3/1994 | Colasanti ............. | B60N 2/286 297/115 |
| RE34,868 E | * | 2/1995 | Vander Stel ......... | B60N 2/3084 297/238 |
| 5,498,062 A | * | 3/1996 | Holdampf ............ | B60N 2/3084 297/14 |
| 5,524,962 A | * | 6/1996 | Fulgenzi .............. | B60N 2/3081 297/236 |
| 5,564,780 A | * | 10/1996 | Presser ................ | B60N 2/2878 297/238 |

(Continued)

FOREIGN PATENT DOCUMENTS

JP        2018114851 A  *  7/2018  ........... B60N 2/3084

*Primary Examiner* — Kyle J. Walraed-Sullivan
(74) *Attorney, Agent, or Firm* — Kenneth L Tolar

(57) ABSTRACT

A child seat includes a horizontal seat panel and a vertical backrest panel that are each respectively received within a designated compartment in the seat and backrest of an existing passenger seat. Upon command, actuators displace both panels from their designated compartments to form a child seat when needed. A blanket is stored within a pocket mounted on the rear surface of the existing backrest to comfort a passenger. The blanket includes sleeves that allow the passenger to use the arms while covered, an opening for receiving a passenger seat headrest and an inflatable neck pillow encircling a head aperture.

11 Claims, 3 Drawing Sheets

(56) References Cited

U.S. PATENT DOCUMENTS

| | | | | |
|---|---|---|---|---|
| 5,568,959 | A * | 10/1996 | Weber | B60N 2/757 297/238 |
| 5,662,377 | A * | 9/1997 | Holdampf | B60N 2/3013 297/14 |
| 5,676,424 | A * | 10/1997 | Winkelhake | B60N 2/1803 248/421 |
| 5,700,054 | A * | 12/1997 | Lang | B60N 2/3084 297/238 |
| 5,704,684 | A * | 1/1998 | Dukatz | B60N 2/3084 297/238 |
| 5,716,097 | A * | 2/1998 | Peck | B60N 2/3084 297/238 |
| 5,899,534 | A * | 5/1999 | Gray | B60N 2/3084 297/484 |
| 6,030,034 | A * | 2/2000 | Plohetski | A47C 7/383 297/188.06 |
| 6,048,027 | A * | 4/2000 | Peck | B60N 2/3084 297/238 |
| 6,773,065 | B1 * | 8/2004 | Stamper | A47D 5/006 297/250.1 |
| 7,000,994 | B2 * | 2/2006 | Leighton | B60R 22/02 297/475 |
| 7,070,239 | B1 * | 7/2006 | Ugrekhelidze | B60N 2/3084 297/105 |
| 7,654,602 | B2 * | 2/2010 | Smiley | B60N 2/2209 296/65.01 |
| 7,887,129 | B2 * | 2/2011 | Hei | B60N 2/2806 297/256.16 |
| 7,997,647 | B2 * | 8/2011 | Sjoquist | B60N 2/14 297/238 |
| 2002/0030394 | A1 * | 3/2002 | Ito | B60N 2/3084 297/256 |
| 2004/0158924 | A1 * | 8/2004 | Frandsen-Anderson | A62C 8/06 5/483 |
| 2007/0108813 | A1 * | 5/2007 | Thomas | B60N 2/2863 297/255 |
| 2010/0170039 | A1 * | 7/2010 | Davis | A47D 15/006 5/494 |
| 2012/0049590 | A1 * | 3/2012 | Parker | B60N 2/2887 297/257 |
| 2012/0212019 | A1 * | 8/2012 | Rodriguez | A47C 31/11 297/219.1 |
| 2015/0069804 | A1 * | 3/2015 | Long | B60N 2/6036 297/228.13 |
| 2015/0126916 | A1 * | 5/2015 | Hall | B60N 2/42 601/149 |
| 2015/0130235 | A1 * | 5/2015 | Herut | B60N 2/2878 297/238 |
| 2017/0112290 | A1 * | 4/2017 | DuVall | A41D 3/08 |
| 2018/0178684 | A1 * | 6/2018 | Virdis | B60N 2/309 |
| 2018/0201162 | A1 * | 7/2018 | Sasaki | B60N 2/1695 |
| 2019/0090667 | A1 * | 3/2019 | Mason | A47G 9/066 |
| 2019/0152355 | A1 * | 5/2019 | Mizuno | B60N 2/26 |
| 2019/0239576 | A1 * | 8/2019 | Harrison | A41D 3/00 |

* cited by examiner

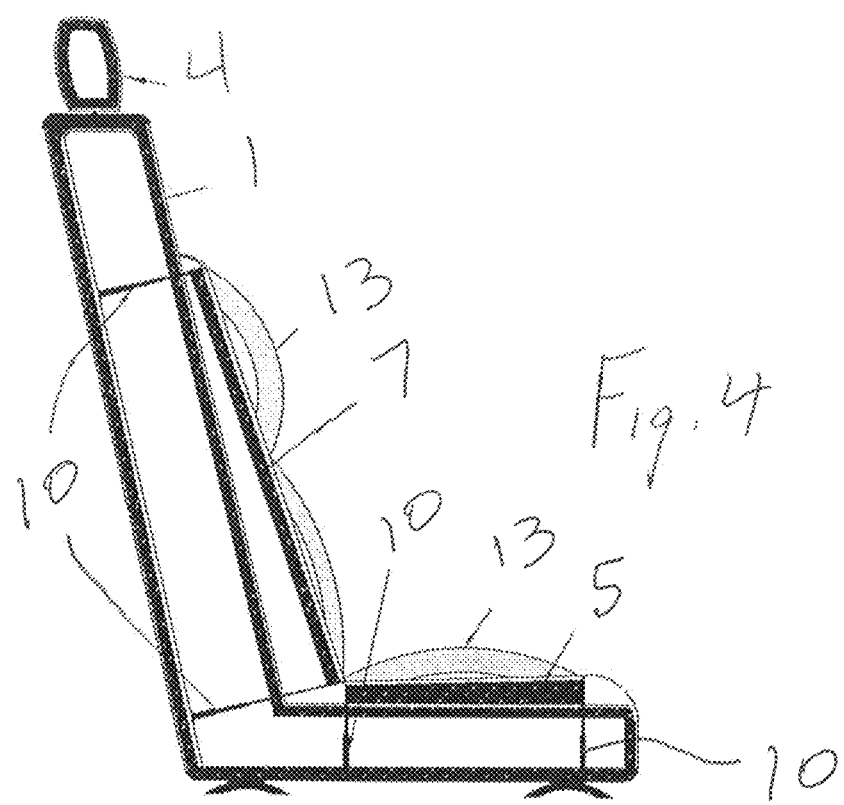
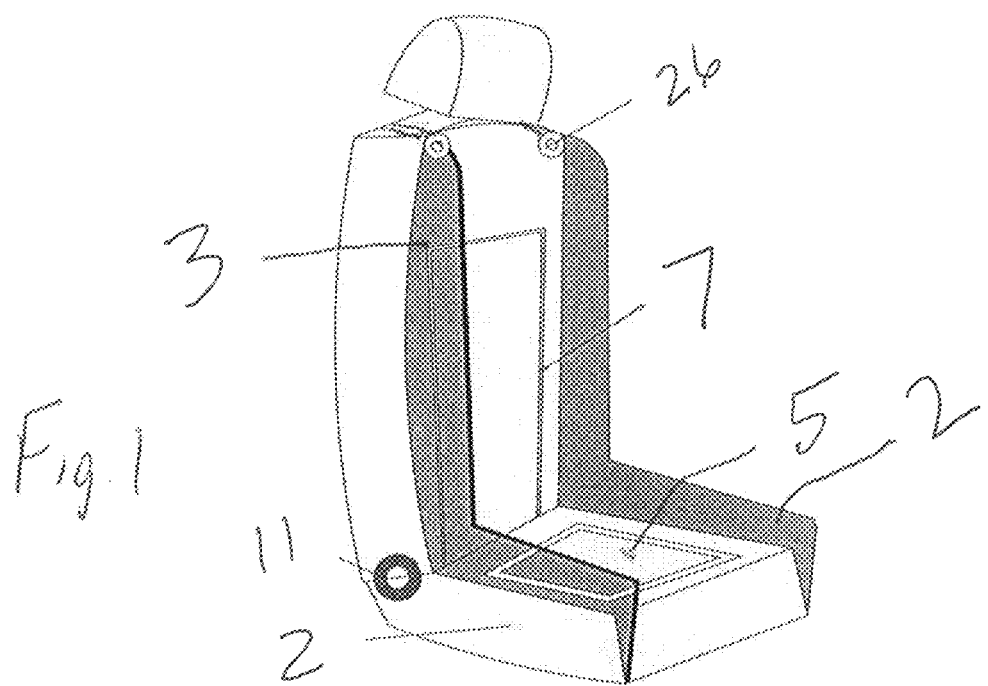

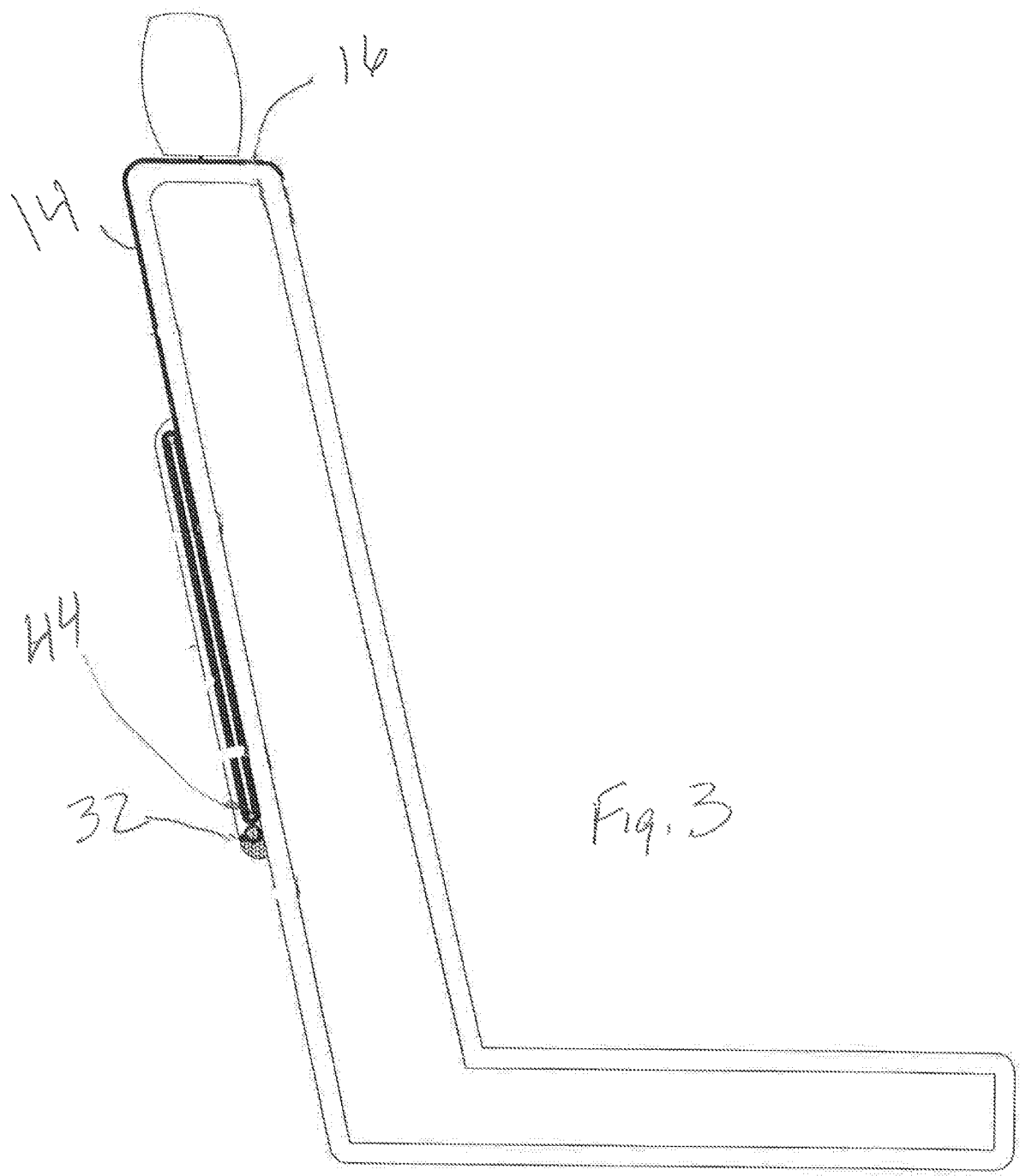

COMBINATION CHILD SEAT AND BLANKET

CROSS REFERENCE TO RELATED APPLICATIONS

None.

BACKGROUND OF THE INVENTION

The present invention relates to a vehicle passenger seat having a deployable child seat and an extendable blanket.

DESCRIPTION OF THE PRIOR ART

Conventional child seats are widely used to safely restrain a small child or infant while traveling in a vehicle. Though safer than the existing passenger seat, a conventional child seat is not foolproof since, in order to be effective, it must be properly tethered to the passenger seat using the vehicle's existing seatbelts to prevent the seat from being projected during a sudden stop or collision. Then the child must be properly restrained within the child seat using a separate harness, which is cumbersome and laborious. In addition, repeatedly transporting a child seat into and out of a vehicle is extremely burdensome and inconvenient. Due to the burdensome nature of conventional child seats, many parents simply fail to properly tether the child seat, or don't use one at all, thereby exposing the child to potential injury or even death.

In addition, restrained infants or adults traveling in conventional passenger seats often require access to a blanket to promote sleep or if ambient temperatures are uncomfortably cold. However, transporting both a blanket and a child seat is also burdensome and aggravating. Even when a child seat is unnecessary, transporting a blanket in a car or other vehicle occupies significant storage space that could otherwise be used for other items.

Accordingly, there is currently a need for a child seat and blanket that address the above-described problems. The present invention solves the aforementioned problems by providing a child seat and blanket that are integrated with an existing passenger seat.

SUMMARY OF THE INVENTION

The present invention relates to a child seat including a horizontal seat panel and a vertical backrest panel that are each respectively received within a designated compartment in the seat and backrest of an existing passenger seat. Upon receipt of a predetermined command, actuators displace both panels from their designated compartments to form a child seat when needed. As the panels are deployed from the existing passenger seat, peripheral bladders inflate to form a restraining barrier around a seated child.

A blanket is stored within a pocket mounted on the rear surface of the existing backrest to comfort a passenger. The blanket includes sleeves that allow the passenger to use the arms while covered, an opening for receiving a passenger seat headrest and an inflatable neck pillow encircling a head aperture.

It is therefore an object of the present invention to provide a child seat that is integral with an existing passenger seat.

It is therefore another object of the present invention to provide a blanket that is integral with an existing passenger seat.

It is yet another object of the present invention to provide a child seat that seamlessly forms part of an existing passenger seat when not needed.

Other objects, features, and advantages of the present invention will become readily apparent from the following detailed description of the preferred embodiment when considered with the attached drawings and the appended claims.

BRIEF DESCRIPTION OF THE DRAWINGS

FIG. 1 is a perspective view of the combination child seat and blanket according to the present invention.

FIG. 3 is a side view of the seat, depicting the blanket and designated storage pocket.

DESCRIPTION OF THE PREFERRED EMBODIMENT

Figure 2:
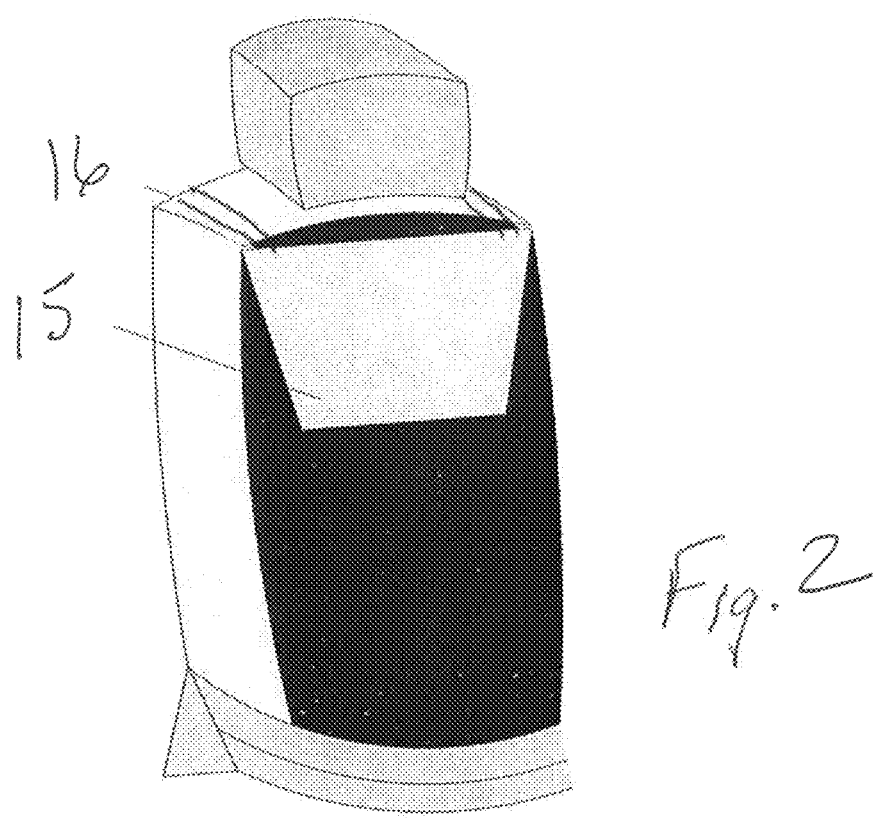
FIG. 2 is a rear view of the seat of FIG. 1.

The present invention relates to a child seat integrated with an existing passenger seat 1 in a vehicle, such as an automobile, bus, train or airplane. The existing passenger seat includes a horizontal seat portion 2 with a backrest 3 vertically extending therefrom. An adjustable headrest 4 is typically positioned on an upper end of the backrest.

The child seat that is integrated with an existing passenger seat of the type described above includes a horizontal seat panel 5 positioned within a compartment formed on the seat portion of the existing passenger seat. When stored within the compartment, the panel 5 conforms to the remainder of the existing seat portion 2 so as to unobtrusively form a part thereof. The child seat also includes a backrest panel 7 positioned within a compartment formed on the existing passenger-seat backrest that likewise conforms to the remainder of the backrest 3 when in a stowed position.

Actuators 10 deploy both the seat and backrest panels from their respective compartments to form a child seat when needed. For example, a plurality of hydraulic, pneumatic or other telescoping cylinders are positioned within the seat for selectively lifting either of the front and rear edges of the seat panel. Similarly, a number of cylinders within the backrest also extend and retract either of the top or bottom edges of the backrest panel. A control button 11 or knob instructs the cylinders to extend and retract to position the panels in a desired position. For example, the panels can simply be deployed from their respective compartments to form a child seat; in addition, the lower edge of the backrest panel can be extended farther than the top edge to recline the backrest; similarly, the front edge of the seat panel can be raised above the rear edge to prevent a seated child from sliding forward.

At each side of the seat and backrest panels are inflatable bladders 13 that form a protective barrier to prevent the child's head, hips or torso from shifting significantly. As the panels are moved out of their respective compartments, the bladders automatically inflate to form a lateral headrest to minimize head-bobbing and to provide a supplemental restraint mechanism for a harness assembly (not pictured). The bladders are automatically inflated with conventional means, such as a compressed air source and solenoid valves, etc.

Figure 5:
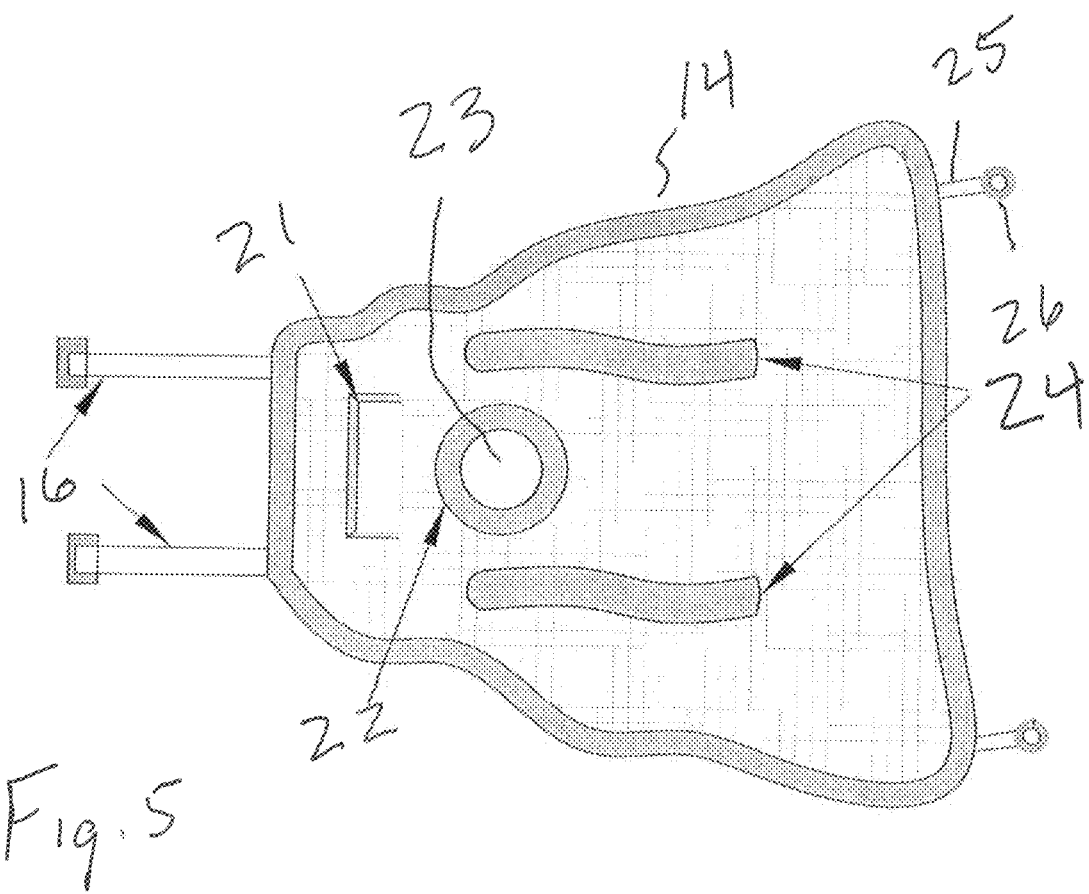
FIG. 5 is an isolated top view of the blanket.
Figure 4:
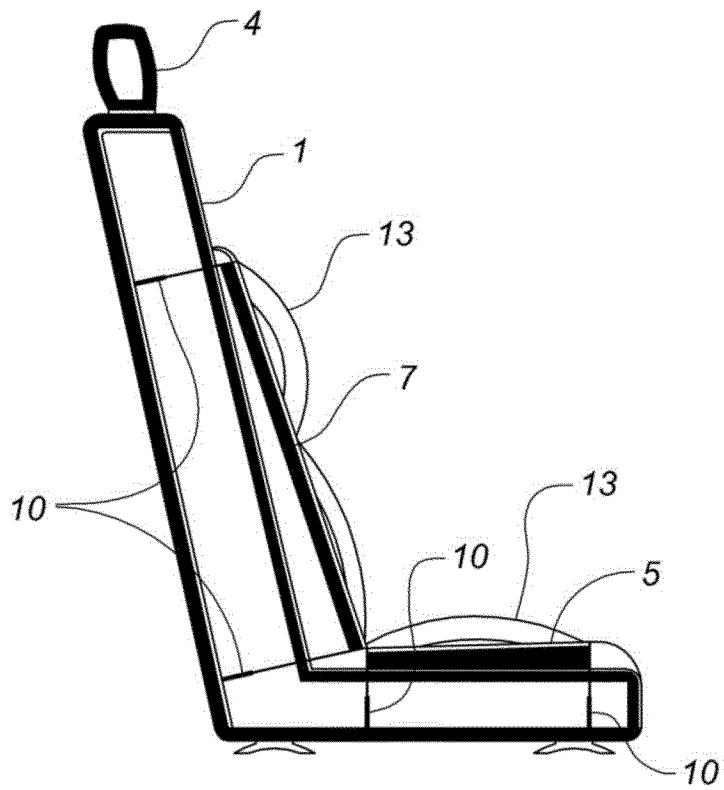
FIG. 4 is a side view of the seat with the seat and backrest panels partially deployed and the bladders inflated.
Figure 5:
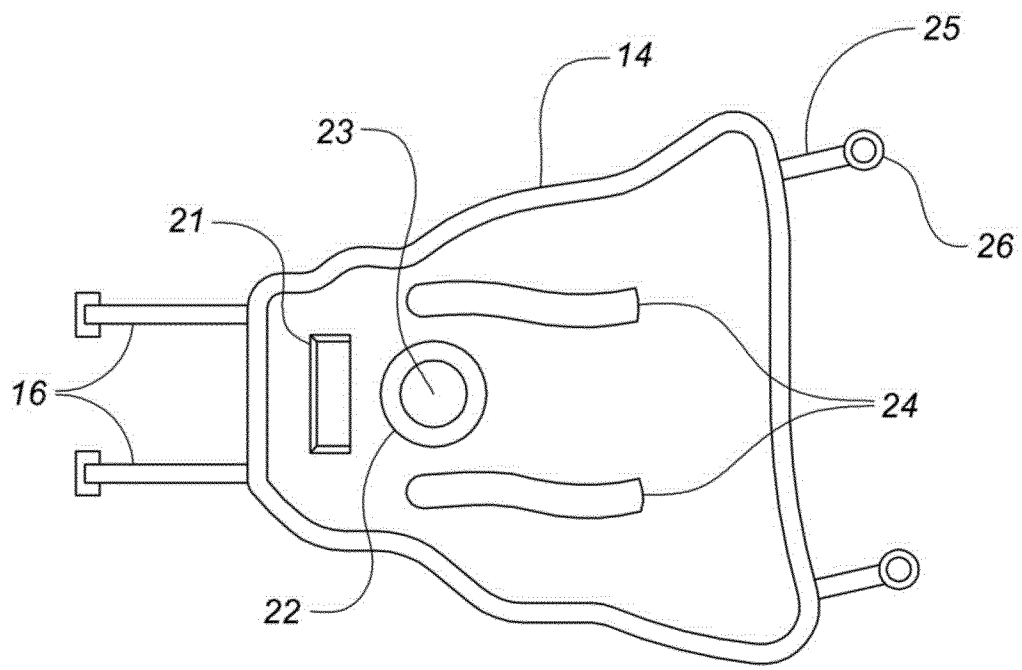

Now referring to FIGS. 3 and 5, a blanket 14 may be deployed from a pocket 15 mounted on the rear surface of the existing passenger-seat backrest to comfort a child or passenger within the seat. The blanket includes a sheet having a front edge, a rear edge, a front surface and a rear surface. Extending from the rear edge are a pair of straps 16 that connect the blanket to a deployment mechanism positioned within the pocket. The deployment mechanism 32 includes a spring-biased roller 44 having the straps spirally wrapped thereabout. The roller ratchets in a similar fashion as a window shade so that whenever the sheet is pulled and released, a pawl or similar mechanism grips the roller thereby locking the sheet at a select extension. When the sheet is pulled slightly and released, the spring propels the roller in an opposite direction to retract the sheet within the pocket.

Near the rear edge of the sheet is an opening 21 dimensioned and configured to receive the headrest on the passenger seat to prevent inadvertent retraction of the blanket. A neck aperture 23 adjacent the headrest opening receives a passenger's head to allow the sheet to comfortably cover the shoulders without excessive manipulation. An inflatable tube 22 encircles the opening to form a neck pillow if desired.

Attached to the front surface of the sheet are a pair sleeves 24 for accommodating a passenger's arms that allow the passenger to write, hold a book, operate an electronic device or perform other tasks while covered. Extending from the front edge of the sheet are a pair of bands 25, each with a finger ring 26 at a distal end that a user grasps to pull the blanket from the storage pocket. As with a conventional window shade, when the rings are released, the blanket will be fixed at a desired position. When the rings are tugged slightly and quickly released, the roller automatically retracts the blanket back into the pocket.

The above-described device is not limited to the exact details of construction and enumeration of parts provided herein. For example, though the blanket has been primarily described for use with the child seat described herein, it can also be incorporated into an existing passenger seat on a bus, airplane, train, or other vehicle. The device may also include a releasable tether, cord, lanyard or similar mechanism that allows the blanket to easily separate from the remainder of the device in the event of an emergency. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

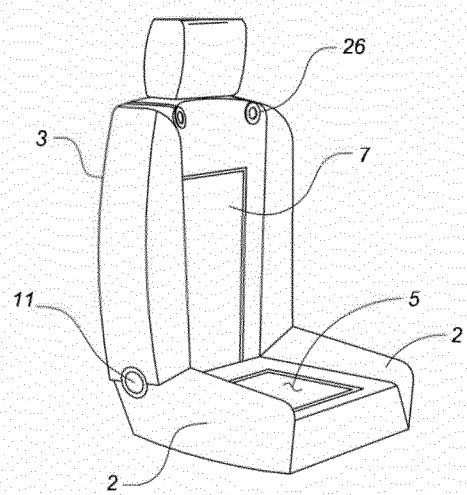

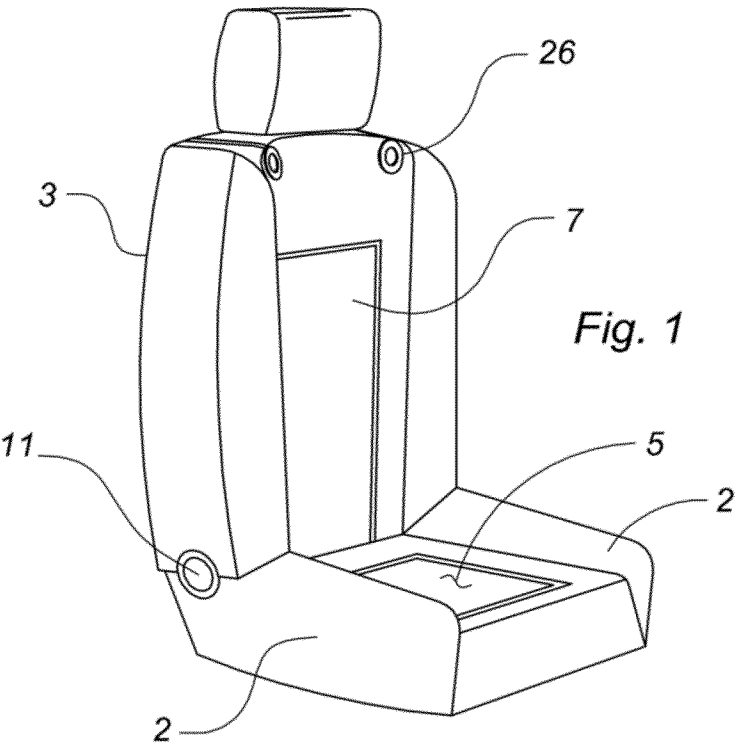
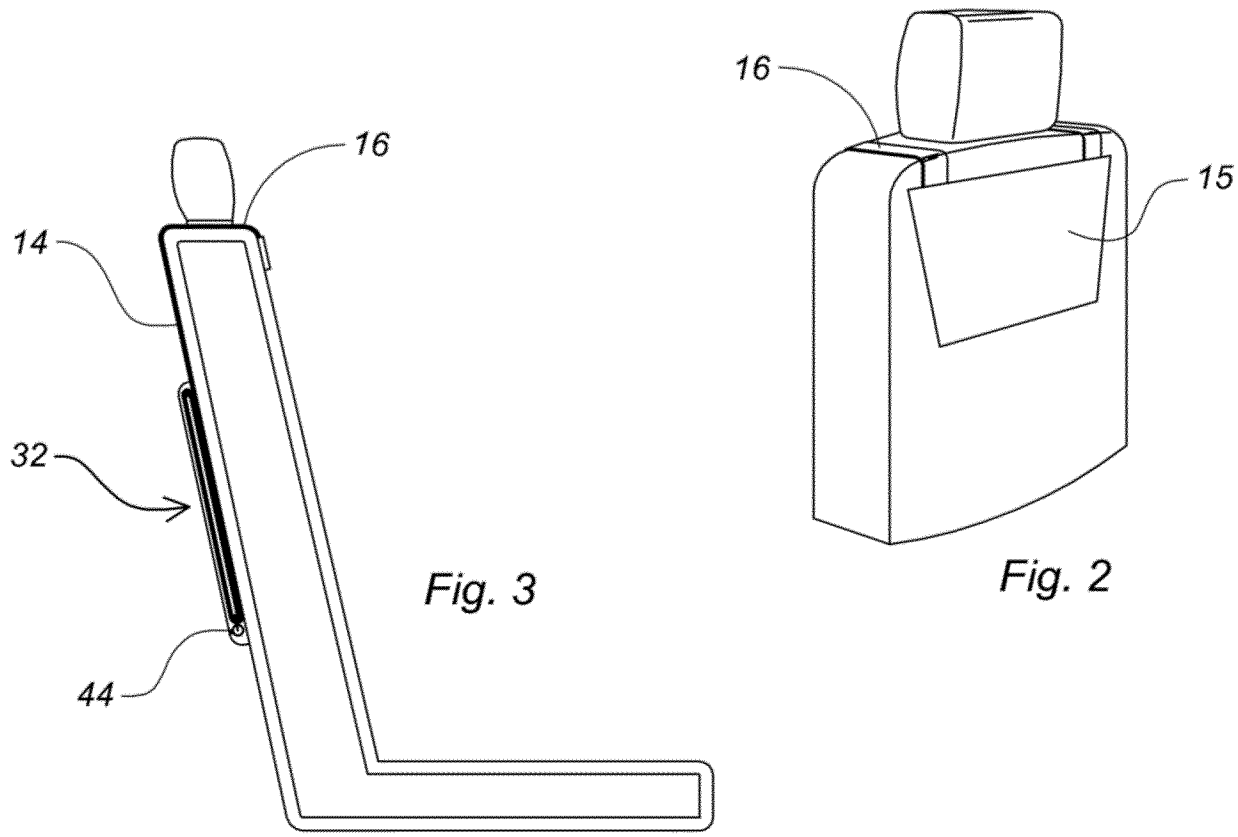

What is claimed is:

1. In combination with a passenger seat having a horizontal seat portion with a backrest vertically extending therefrom, and a headrest positioned on an upper end of the backrest, a child seat comprising:
    a horizontal seat panel positioned within a first compartment on the horizontal seat portion of the passenger seat;
    a backrest panel positioned within a second compartment formed on the backrest of the passenger seat;
    means for deploying the horizontal seat panel from the first compartment, and the backrest panel from the second compartment to form the child seat;
    a blanket deployable from a pocket mounted on the backrest of the passenger seat, wherein said blanket further comprises a rear edge with a pair of straps extending therefrom, said pair of straps spirally wrapped about a spring-biased roller that allows said blanket to extend from and retract within said pocket.

2. The child seat according to claim 1 wherein said means for deploying the horizontal seat panel from the first compartment and the backrest panel from the second compartment to form the child seat comprises:
    a first telescopic cylinder beneath said horizontal seat panel;
    a second telescopic cylinder adjacent said backrest panel;
    means for extending and retracting said first telescopic cylinder and said second telescopic cylinder.

3. The child seat according to claim 1 wherein said horizontal seat panel conforms to the horizontal seat portion when in a stowed position to unobtrusively form a part of said passenger seat.

4. The child seat according to claim 1 wherein said backrest panel conforms to the backrest when in a stowed position to unobtrusively form a part of said passenger seat.

5. The child seat according to claim 1 further comprising inflatable bladders adjacent to each of two opposing sides of said horizontal seat panel and said backrest panel that form a protective barrier to prevent the child's head, hips or torso from shifting.

6. The child seat according to claim 5 further comprising a means for automatically inflating said inflatable bladders as said horizontal seat panel and said backrest panel are deployed.

7. The child seat according to claim 1 further comprising an opening adjacent the rear edge of the blanket, said opening dimensioned and configured to receive the headrest on said passenger seat to prevent inadvertent retraction of the blanket.

8. The child seat according to claim 7 further comprising a neck aperture adjacent to said opening for accommodating a passenger's head to allow the blanket to cover the shoulders.

9. The child seat according to claim 7 further comprising an inflatable tube encircling the opening that forms a neck pillow.

10. The child seat according to claim 1 wherein said blanket further comprises a front surface having a pair of sleeves thereon for receiving a passenger's arms to allow the passenger to perform tasks while covered.

11. The child seat according to claim 1 wherein said blanket further comprises a front edge having a pair of bands extending therefrom that a user grasps to pull the blanket from the pocket.

\* \* \* \* \*

UNITED STATES PATENT AND TRADEMARK OFFICE
CERTIFICATE OF CORRECTION

| | |
|---|---|
| PATENT NO. | : 10,875,425 B1 |
| APPLICATION NO. | : 16/282625 |
| DATED | : December 29, 2020 |
| INVENTOR(S) | : Ashu |

It is certified that error appears in the above-identified patent and that said Letters Patent is hereby corrected as shown below:

Delete the title page and substitute therefore with the attached title page consisting of the corrected illustrative figure(s).

Please replace FIGS. 1-5 with FIGS. 1-5 as shown on the attached pages.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*

(12) United States Patent
Ashu

(10) Patent No.: US 10,875,425 B1
(45) Date of Patent: Dec. 29, 2020

(54) COMBINATION CHILD SEAT AND BLANKET

(71) Applicant: Wilson Ashu, Fort Worth, TX (US)

(72) Inventor: Wilson Ashu, Fort Worth, TX (US)

(*) Notice: Subject to any disclaimer, the term of this patent is extended or adjusted under 35 U.S.C. 154(b) by 0 days.

(21) Appl. No.: 16/282,625

(22) Filed: Feb. 22, 2019

(51) Int. Cl.
| | |
|---|---|
| *B60N 2/30* | (2006.01) |
| *B60N 2/26* | (2006.01) |
| *B60N 2/64* | (2006.01) |
| *B60N 2/90* | (2018.01) |
| *A47G 9/02* | (2006.01) |
| *A47G 9/06* | (2006.01) |

(52) U.S. Cl.
CPC .......... *B60N 2/26* (2013.01); *A47G 9/0223* (2013.01); *B60N 2/64* (2013.01); *B60N 2/90* (2018.02); *A47G 9/068* (2013.01); *B60N 2/3084* (2013.01); *B60N 2/3086* (2013.01); *B60N 2205/30* (2013.01)

(58) Field of Classification Search
CPC ...... A47G 9/068; A47G 9/066; A47G 9/0223; A47G 9/064; A47D 15/006; B60N 2/2881; B60N 2/914; B60N 2/3081; B60N 2/3084; B60N 2/3086; A47C 7/62
See application file for complete search history.

(56) References Cited

U.S. PATENT DOCUMENTS

| | | | | |
|---|---|---|---|---|
| 4,540,216 A | * | 9/1985 | Hassel, Sr. | B60N 2/3084 297/112 |
| 4,555,135 A | * | 11/1985 | Freeland | B60N 2/3086 297/105 |
| 4,664,443 A | * | 5/1987 | Casale | B60N 2/3084 297/238 |
| 4,756,573 A | * | 7/1988 | Simin | B60N 2/3084 297/117 |
| 4,913,498 A | * | 4/1990 | Forlivio | B60N 2/3084 297/238 |
| 5,100,199 A | * | 3/1992 | Vander Stel | A61K 31/155 297/238 |
| 5,294,182 A | * | 3/1994 | Colasanti | B60N 2/286 297/115 |
| RE34,868 E | * | 2/1995 | Vander Stel | B60N 2/3084 297/238 |
| 5,498,062 A | * | 3/1996 | Holdampf | B60N 2/3084 297/14 |
| 5,524,962 A | * | 6/1996 | Fulgenzi | B60N 2/3081 297/236 |
| 5,564,780 A | * | 10/1996 | Presser | B60N 2/2878 297/238 |

(Continued)

FOREIGN PATENT DOCUMENTS

JP 2018114851 A * 7/2018 .......... B60N 2/3084

*Primary Examiner* — Kyle J. Walraed-Sullivan
(74) *Attorney, Agent, or Firm* — Kenneth L Tolar

(57) ABSTRACT

A child seat includes a horizontal seat panel and a vertical backrest panel that are each respectively received within a designated compartment in the seat and backrest of an existing passenger seat. Upon command, actuators displace both panels from their designated compartments to form a child seat when needed. A blanket is stored within a pocket mounted on the rear surface of the existing backrest to comfort a passenger. The blanket includes sleeves that allow the passenger to use the arms while covered, an opening for receiving a passenger seat headrest and an inflatable neck pillow encircling a head aperture.

11 Claims, 2 Drawing Sheets